US008203125B2

(12) United States Patent
Shim et al.

(10) Patent No.: US 8,203,125 B2
(45) Date of Patent: Jun. 19, 2012

(54) LIGHT TO HEAT CONVERSION LAYER INCORPORATING MODIFIED PIGMENT

(75) Inventors: Anne K. Shim, Plaistow, NH (US); Joseph B. Carroll, Bradford, MA (US)

(73) Assignee: Cabot Corporation, Boston, MA (US)

( * ) Notice: Subject to any disclaimer, the term of this patent is extended or adjusted under 35 U.S.C. 154(b) by 821 days.

(21) Appl. No.: 12/215,230

(22) Filed: Jun. 26, 2008

(65) Prior Publication Data

US 2009/0008576 A1    Jan. 8, 2009

Related U.S. Application Data

(60) Provisional application No. 60/937,485, filed on Jun. 28, 2007.

(51) Int. Cl.
*A61N 5/00* (2006.01)
(52) U.S. Cl. ............. 250/492.1; 106/400; 106/472; 430/18; 430/271.1; 430/944; 430/138; 430/300; 430/200; 430/270.1; 250/318; 250/316.1
(58) Field of Classification Search ............... 250/492.1; 106/400, 472; 430/18, 271.1, 944, 138, 300, 430/200, 270.1
See application file for complete search history.

(56) References Cited

U.S. PATENT DOCUMENTS

| | | | |
|---|---|---|---|
| 5,521,035 A | 5/1996 | Wolk et al. | |
| 5,523,192 A | 6/1996 | Blanchet-Fincher | |
| 5,563,019 A | 10/1996 | Blanchet-Fincher | |
| 5,695,907 A | 12/1997 | Chang | |
| 5,863,860 A | 1/1999 | Patel et al. | |
| 5,885,335 A | 3/1999 | Adams et al. | |
| 6,190,826 B1 | 2/2001 | Chang et al. | |
| 6,194,119 B1 | 2/2001 | Wolk et al. | |
| 6,855,384 B1 | 2/2005 | Nirmal et al. | |
| 6,921,614 B2 | 7/2005 | Andrews et al. | |
| 7,108,949 B2 | 9/2006 | Kim et al. | |
| 2002/0011185 A1 | 1/2002 | Belmont | |
| 2002/0020318 A1* | 2/2002 | Galloway et al. | 101/401.1 |
| 2005/0090594 A1 | 4/2005 | Nguyen | |
| 2007/0082288 A1 | 4/2007 | Wright et al. | |
| 2007/0295242 A1 | 12/2007 | Shim et al. | |

OTHER PUBLICATIONS

Lee et al., "Laser-Induced Thermal Imaging of Polymer Light-Emitting Materials on Poly (3,4-ethylenedioxythiophene): Silane Hole-Transport Layer," Advanced Materials 2004, 15, No. I, Jan. 5.
Lidzey et al., "Laser-assisted patterning of conjugated polymer light emitting diodes," Organic Electronics 6 (2005) 221-228.
Whitesides, "The origins and the future of microfluidics," Nature, vol. 442, Jul. 27, 2006, pp. 368-373.

* cited by examiner

*Primary Examiner* — Jack Berman
*Assistant Examiner* — Meenakshi Sahu

(57) ABSTRACT

A LTHC layer for use in radiation induced thermal transfer includes a modified pigment.

93 Claims, 4 Drawing Sheets

LIGHT TO HEAT CONVERSION LAYER INCORPORATING MODIFIED PIGMENT

This application claims the priority of U.S. Provisional Application No. 60/937,485, filed Jun. 28, 2007, the entire contents of which are incorporated by reference herein.

BACKGROUND OF THE INVENTION

1. Field of the Invention

This invention relates to the exploitation of modified pigments for laser-induced thermal transfer.

2. Description of the Related Art

Thermal transfer processes such as, for example, dye sublimation, dye transfer, melt transfer, and ablative material transfer, are well known in applications such as color proofing and lithography. These processes often employ a donor element that includes a layer of material to be transferred ("transfer layer"), and a receiving element that includes a substrate for receiving the transferred material (a "receiving substrate"). The donor element and the receiving substrate are brought into close proximity or direct contact with each other, and portions of the donor element are heated to transfer the corresponding portions of the transfer layer to the receiving substrate. Heat may be generated using a heating element (e.g., a resistive heating element), converting radiation (e.g., light) to heat, and/or applying an electrical current to a layer of the thermal transfer element.

In a digital transfer process, the exposure to radiation takes place only in a small, selected region of the assembly of the donor element and receiving substrate at one time, so that transfer of material from the donor element to the receiving substrate occurs in a patterned manner. Thus, a non-patterned donor is in this manner selectively transferred to a receiving substrate in a patterned manner. Computer control facilitates high resolution and high speed transfer. Alternatively, in an analog process, the entire assembly may be irradiated and a mask may be used to selectively expose desired portions of the thermally imageable layer. See, for example, U.S. Pat. Nos. 5,857,709 and 5,937,272.

Patterning materials using thermal transfer processes is generally faster and less expensive and can provide greater resolution than patterning by using photolithographic processes. Thermal transfer using light can also provide better accuracy and quality control for very small devices, such as small optical and electronic devices, including, for example, transistors and other components of integrated circuits, as well as components for use in a display, such as electroluminescent lamps and control circuitry. The size and shape of the transferred pattern (e.g., a line, circle, square, or other shape) can be controlled by, for example, selecting the size of the light beam, the exposure pattern of the light beam, the duration of directed beam contact with the thermal transfer element, and the materials of the thermal transfer element. Moreover, thermal transfer using light may, at least in some instances, provide for better registration when forming multiple devices over an area that is large compared to the device size. Methods and devices for performing light-induced thermal transfer are known to those of skill in the art and are described in U.S. Pat. Nos. 6,194,119; 7,108,949; 6,921,614; 5,523,019; and 6,855,384.

Thermal transfer to pattern layers from donor elements can also be useful to de-couple layer coating steps from patterning steps, for example where such coupling can limit the types of layered structures, or the types of adjacent structures, that can be patterned. Because no solvent is required for thermal transfer, materials can be patterned that may be sensitive to the various solvents are employed in prior art lithographic methods. Conversely, materials may also be patterned without concern that solvents may adversely affect previously deposited materials. Biological materials especially may be patterned without risking denaturation of proteins or the interruption of hydrogen bonds between or within nucleic acid molecules.

In some donor elements, a separate heat generating layer is employed. The heat generating layer may be a light to heat conversion (LTHC) layer incorporating a material that absorbs a desired wavelength of radiation and converts at least a portion of the incident radiation to heat. The heat from the LTHC layer heats the transfer layer, causing the material to be transferred to the receiving substrate.

LTHC layers have employed pigments such as carbon black in polymer compositions (see, for example, U.S. Pat. Nos. 5,695,907, 5,863,860, 6,190,826, and 6,194,119). Such pigments are finely divided, insoluble, solid particles which are, in general, not readily dispersible in liquid vehicles.

Difficulties with dispersion of the pigment generates a number of disadvantages for the production of thermal transfer devices. Where a separate LTHC layer is employed, the inability to incorporate sufficient amounts of pigment into the LTHC layer can reduce the optical density of the LTHC layer, increasing the amount of light required to accomplish thermal transfer. While dispersants may be used to facilitate dispersion of the pigment, these can increase the viscosity of the dispersion. High viscosity dispersions increase the difficulty of manufacturing layers incorporating these dispersions. Known techniques for producing thin layers, e.g., microgravure printing, may not be suitable for use with high viscosity media, and thicker layers may be required to avoid pinholes and other defects. However, thicker layers result in increased materials expenses during manufacturing and also increase the amount of light required to accomplish thermal transfer, as it will take longer to heat the thicker layer. Furthermore, because it takes longer to conduct heat across the thickness of a thicker LTHC layer, heat will convect laterally along the LTHC layer, further decreasing the resolution of the thermal transfer device.

Thus, it is desirable to have thinner, smoother LTHC layers without sacrificing optical density for use in light induced thermal transfer since they can be used to deliver images with higher resolution and lower line edge roughness at lower materials cost.

SUMMARY OF THE INVENTION

In one aspect, the invention includes a light to heat conversion (LTHC) layer. The LTHC layer includes a combination product of a dispersant and a modified pigment including a pigment having attached at least one organic group including an ionic or an ionizable group and a matrix in which the combination product is disposed. The matrix may include a polymer or a resin, or both. The LTHC layer may include from about 10% to about 55% of the modified pigment by weight. The pigment may be a carbonaceous pigment or a colored pigment, for example, a carbon black. The organic group may include at least one carboxylic acid group, at least one sulfonic acid group, a salt of either of the above, or at least one a hydroxyl group, for example, a $C_6H_4$—COOH group, a —$C_6H_4$—$SO_3H$ group, or a salt of either of the above. The LTHC layer may be at most about 4 micrometers thick and/or may have a surface roughness of at most about 7%. The LTHC layer may have an optical density from about 0.2 to about 3 at a predetermined wavelength, which may be in the infrared portion of the electromagnetic spectrum.

In another aspect, the invention includes a thermal transfer donor element. The thermal transfer donor element includes an LTHC layer which in turn includes a combination product of a dispersant with a modified pigment including a pigment having attached at least one organic group including an ionic or an ionizable group and a matrix in which the combination product is disposed. The thermal transfer donor element may further include a substrate supporting the LTHC layer, an adhesion layer disposed between the substrate and the LTHC layer, a transfer layer, and/or an interlayer disposed between the transfer layer and the LTHC layer. The transfer layer may include a biologically active material, a material for a color filter, a material for a black matrix, a material for an organic light emitting diode, a material for an alignment layer for a liquid crystal display, or a material for a transparent electrode.

In another aspect, the invention includes a thermal transfer donor element which is produced by a method including providing a substrate, combining a modified pigment concentrate, a solvent and a matrix precursor including one or more of at least one monomer, at least one oligomer, at least one polymer, and at least one resin to form a mixture, wherein the modified pigment concentrate includes a combination product of a dispersant with a modified pigment including a pigment having attached at least one organic group including an ionic or an ionizable group, disposing the mixture over the substrate, and removing the solvent from the disposed mixture to form a modified pigment-containing layer.

The method may further include curing the matrix precursor to form a matrix in which the combination product is dispersed, and curing may include irradiating the mixture at a predetermined wavelength or bringing the mixture to a temperature at which the monomer polymerizes. The method may further include disposing an adhesion layer over the substrate, wherein disposing the mixture includes disposing the mixture over the adhesion layer. The method may further include disposing a transfer layer over the modified pigment-containing layer and/or disposing an interlayer between the modified pigment-containing layer and the transfer layer. The mixture may further include an initiator, an adhesion promoter, or both and/or may have a viscosity less than 50 cP. Disposing the mixture may include using one or more of microgravure coating, spin coating, gravure printing, web coating, dip coating, slit coating, and slot coating.

In another aspect, the invention includes a method of performing laser induced thermal transfer. The method includes providing a thermal transfer donor element including a substrate and an LTHC layer supported by the substrate, the thermal transfer donor element having a transfer layer disposed thereon and the LTHC layer including a combination product of a dispersant with a modified pigment including a pigment having attached at least one organic group including an ionic or an ionizable group and a matrix in which the combination product is disposed, placing the thermal transfer donor element against a receiving substrate; and irradiating at least a portion of the thermal transfer donor element with sufficient energy in a predetermined pattern to transfer at least a portion of the transfer layer to the receiving substrate according to the predetermined pattern.

The surface roughness of the LTHC layer may be at most about 7%. The transfer layer may include a polymer matrix. The transfer layer may include a biologically active material, a material for a color filter, a material for a black matrix, a material for an organic light emitting diode, a material for an alignment layer for a liquid crystal display, or a material for a transparent electrode.

In another aspect, the invention includes an LTHC layer including a light absorbing material and a matrix in which the light absorbing material is dispersed, the LTHC layer having a surface roughness of at most 7%. The LTHC layer may have a thickness of at most about 4 micrometers. The light absorbing material may be a combination product of a dispersant and a modified pigment, the modified pigment including a pigment having attached at least one organic group including an ionic or an ionizable group. The light absorbing material is a combination product of a dispersant and a modified pigment, the modified pigment including an oxidized carbon black. The light absorbing material may be a modified pigment including a pigment having attached at least one polymer.

In another aspect, the invention includes an LTHC layer produced by a process including providing a mixture including a solvent, a combination product of a dispersant with a modified pigment including a pigment having attached at least one organic group including an ionic or an ionizable group, and a matrix precursor including one or more of at least one monomer, at least one oligomer, at least one polymer, and at least one resin, providing a substrate, disposing the mixture over the substrate, and removing the solvent from the disposed mixture, wherein the disposed mixture exhibits self leveling behavior during the removal of solvent. The method may further include curing the matrix precursor to form a matrix in which the combination product is dispersed.

In another aspect, the invention includes an LTHC layer including a combination product of a dispersant and a modified pigment including an oxidized carbon black and a matrix in which the combination product is disposed.

In another aspect, the invention includes a thermal transfer donor element including an LTHC layer, the LTHC layer including a combination product of a dispersant with a modified pigment including an oxidized carbon black and a matrix in which the combination product is disposed.

In another aspect, the invention includes a thermal transfer donor element produced by a method including providing a substrate, combining a modified pigment concentrate, a solvent and a matrix precursor including one or more of at least one monomer, at least one oligomer, at least one polymer, and at least one resin to form a mixture, wherein the modified pigment concentrate including a combination product of a dispersant with a modified pigment including an oxidized carbon black, disposing the mixture over the substrate, and removing the solvent from the disposed mixture to form a modified pigment-containing layer.

In another aspect, the invention includes a method of performing laser induced thermal transfer including providing a thermal transfer donor element including a substrate and an LTHC layer supported by the substrate, the thermal transfer donor element having a transfer layer disposed thereon and the LTHC layer including a combination product of a dispersant with a modified pigment including an oxidized carbon black and a matrix in which the combination product is disposed, placing the thermal transfer donor element against a receiving substrate, and irradiating at least a portion of the thermal transfer donor element with sufficient energy in a predetermined pattern to transfer at least a portion of the transfer layer to the receiving substrate according to the predetermined pattern.

In another aspect, the invention includes an LTHC layer produced by a process including providing a mixture including a solvent, a combination product of a dispersant with a modified pigment including an oxidized carbon black, and a matrix precursor including one or more of at least one monomer, at least one oligomer, at least one polymer, and at least one resin, providing a substrate, disposing the mixture over the substrate, and removing the solvent from the disposed mixture, wherein the disposed mixture exhibits self leveling behavior during the removal of solvent.

In another aspect, the invention includes an LTHC layer including a modified pigment including a pigment having attached at least one polymer and a matrix in which the modified pigment is disposed.

In another aspect, the invention includes a thermal transfer donor element including an LTHC layer, the LTHC layer including a modified pigment including a pigment having attached at least one polymer and a matrix in which the modified pigment is disposed.

In another aspect, the invention includes a thermal transfer donor element produced by a method including providing a substrate, combining a modified pigment concentrate, a solvent and a matrix precursor including one or more of at least one monomer, at least one oligomer, at least one polymer, and at least one resin to form a mixture, wherein the modified pigment concentrate including a modified pigment including a pigment having attached at least one polymer, disposing the mixture over the substrate, and removing the solvent from the disposed mixture to form a modified pigment-containing layer.

In another aspect, the invention includes a method of performing laser induced thermal transfer including providing a thermal transfer donor element including a substrate and an LTHC layer supported by the substrate, the thermal transfer donor element having a transfer layer disposed thereon and the LTHC layer including a modified pigment including a pigment having attached at least one polymer and a matrix in which the modified product is disposed, placing the thermal transfer donor element against a receiving substrate, and irradiating at least a portion of the thermal transfer donor element with sufficient energy in a predetermined pattern to transfer at least a portion of the transfer layer to the receiving substrate according to the predetermined pattern.

In another aspect, the invention is an LTHC layer produced by a process including providing a mixture including a modified pigment including a pigment having attached at least one polymer, a solvent, and a matrix precursor including one or more of at least one monomer, at least one oligomer, at least one polymer, and at least one resin, providing a substrate, disposing the mixture over the substrate, and removing the solvent from the disposed mixture, wherein the disposed mixture exhibits self leveling behavior during the removal of solvent.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

DETAILED DESCRIPTION OF THE INVENTION

Figure 1:
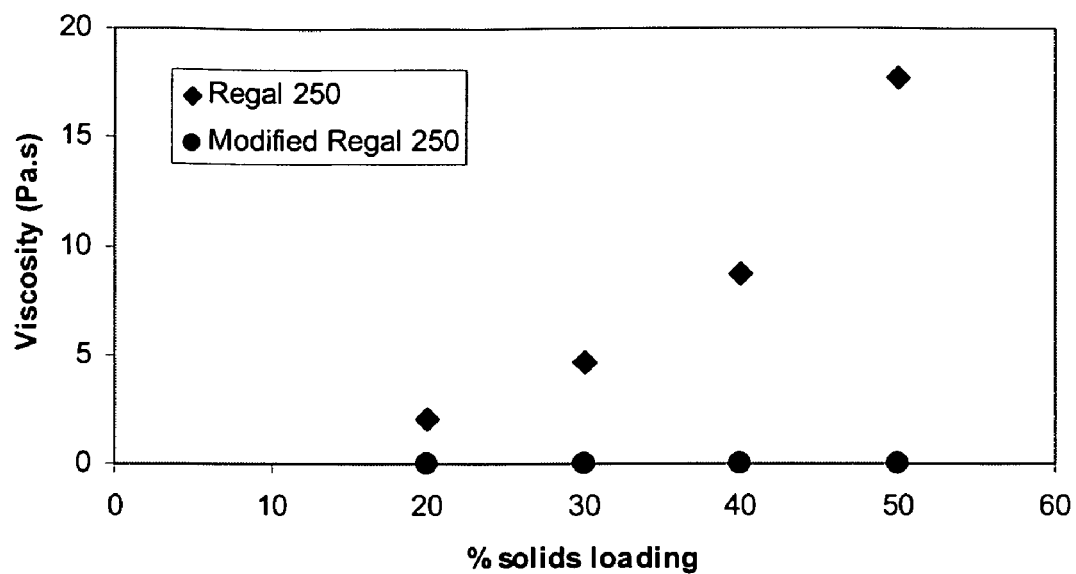
FIG. 1 is a graph showing the viscosity with respect to loading level for modified and unmodified Regal® 250 carbon black in solvent.

We have discovered that the use of modified pigments in LTHC layers enables the production of thinner layers exhibiting lower surface roughness than has been previously possible with the use of unmodified pigments. Such LTHC layers result in thermal transfer devices that can be used to produce higher resolution patterns with lower line edge roughnesses. We have developed modified pigments, including modified colored pigments, that can be exploited to prepare dispersions that have not previously been used in thermal transfer applications. The modified pigment may be an oxidized carbon black. Alternatively, the modified pigment may include a pigment having attached at least one organic group. In another embodiment, the modified pigment may be a pigment having attached at least one attached polymer. The modified pigment may be distributed in a matrix, for example, a cross-linked polymer matrix. The modified pigment employed in the LTHC layer may be organic, inorganic, or a combination of both. Preferably, the modified pigment absorbs energy at an infrared wavelength, for example, 1064 or 808 nm, and relaxes by releasing thermal energy. In preferred embodiments, coatings employed as a LTHC layer and containing modified pigments exhibit an optical density of about 0.2-3 at a desired wavelength, e.g., a wavelength employed to perform light induced thermal transfer.

The pigment to be modified may be one conventionally used by those of skill in the art for inks, coatings, etc., such as carbonaceous pigments and colored pigments including pigments including a blue, black, brown, cyan, green, white, violet, magenta, red, orange, or yellow pigment. Mixtures of different pigments can also be used. Examples of suitable carbonaceous pigments include carbon products such as graphite, carbon black, vitreous carbon, carbon fibers, activated charcoal, activated carbon, and carbon nanotubes. The carbon may be of the crystalline or amorphous type. Finely divided forms of the above are preferred; also, it is possible to utilize mixtures of different carbons. Of these carbon products, carbon black is preferred.

Representative examples of carbonaceous pigments include various carbon blacks such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation. Examples of these include but are not limited to Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, and Vulcan® P.

Suitable classes of colored pigments include, for example, anthraquinones, phthalocyanine blues, phthalocyanine greens, diazos, monoazos, pyranthrones, perylenes, heterocyclic yellows, quinolonoquinolones, quinacridones, and (thio)indigoids. Such pigments are commercially available in either powder or press cake form from a number of sources including, BASF Corporation, Engelhard Corporation, and Sun Chemical Corporation. Additional classes of colored pigments include, for example, iron oxide pigments (natural and synthetic), chromium oxide pigments, mixed metal oxide pigments, cadmium pigments, bismuth pigments, chromate pigments, ultramarine pigments, iron blue pigments, magnetic pigments, anticorrosive pigments, luster pigments, and luminescent pigments. Specific colored pigments include, for example, Prussian Blue (Pigment Blue 27), copper phthalocyanine (Pigment Blue 15) and many of its substituted derivatives, and phthalocyanine-based pigments such as those available from Yamamoto and Avecia. Examples of other suitable colored pigments are described in U.S. Patent Publication No. 20070082288, the Colour Index, 3rd edition (The Society of Dyers and Colourists, 1982) and in Industrial Inorganic Pigments, $1^{st}$ edition (VCH Publishers, Inc., New York, N.Y., 1993).

The pigment to be modified may have a wide range of BET surface areas, as measured by nitrogen adsorption, depending on the desired properties of the dispersion. If a higher surface area pigment is not readily available for the desired application, it is also well recognized by those skilled in the art that the pigment may be subjected to conventional size reduction or comminution techniques, such as media, ball or jet milling, to reduce the material to a smaller particle size, if desired. Furthermore, the pigment may exhibit a wide range of structure or branching as measured by dibutylphthalate absorption (DBP) values for carbonaceous pigments or oil absorption values (as described in ISO 787 T5) for colored pigments.

When the pigment is a carbonaceous material such as carbon black, it may be modified by oxidation using an oxidizing agent in order to introduce hydroxyl or ionic and/or ionizable groups onto the surface. Any of the carbon blacks described above can be so oxidized. Oxidized carbonaceous pigments, such as oxidized carbon blacks, prepared in this way have been found to have a higher degree of oxygen-containing groups on the surface. Oxidizing agents include, but are not limited to, oxygen gas, ozone, peroxides such as hydrogen peroxide, persulfates, including sodium, potassium, or ammonium persulfate, hypohalites such a sodium hypochlorite, oxidizing acids such as nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, carbonaceous pigments such as carbon black that are modified using other surface modification methods, such as chlorination and sulfonylation, to introduce ionic or ionizable groups onto a pigment surface, may also be used.

The modified pigment may alternatively include a pigment having attached at least one organic group. Preferably, the organic group includes at least one ionic group, at least one ionizable group, or a mixture thereof. In some embodiments, the organic group is directly attached. In other embodiments, a macromolecule, such as a polymer or oligomer is attached to the pigment. The pigment to be modified may be any of those described above. The modified pigments may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, 6,042,643, 6,664,312, 6,551,393, 6,372,820, 6,368,239, 6,350,519, 6,337,358, and 6,102,380, PCT Publication WO 99/23174, and U.S. Patent Publication No. 20060211791. Briefly, the material being attached to the pigment and the pigment are combined. An aqueous solution of a nitrite and an acid are then added separately or together to generate the diazonium reaction and form the diazonium salt, which reacts with the pigment. This generation of the diazonium salt is preferably accomplished in situ with the pigment. In the diazonium reaction, the primary amine group will react to form nitrogen gas or other by-products which will then permit the polymer molecule to attach onto the pigment. Such methods provide for a more stable attachment of the groups onto the pigment compared to dispersant type methods, which use, for example, polymers and/or surfactants. Other methods for preparing the modified pigments include reacting a pigment having available functional groups with a reagent including the organic group. Such modified pigments may also be prepared using the methods described in the references discussed above. In addition, modified carbon blacks containing specific functional groups may also be prepared by the methods described in U.S. Pat. Nos. 6,831,194 and 6,660,075, U.S. Patent Publications Nos. 2003-0101901 and 2001-0036994, Canadian Patent No. 2,351,162, European Patent No. 1 394 221, and PCT Publication No. WO 04/63289.

The attached organic group may be chosen depending on a variety of factors, including the specific type of solvent, the desired dispersant, as well as the intended use of the dispersion. This allows for greater flexibility by tailoring properties of the modified pigment dispersion. In a preferred embodiment, the organic group includes at least one ionic group, at least one ionizable group, or a mixture of at least one ionic group and at least one ionizable group. An ionic group is either anionic or cationic and is associated with a counterion of the opposite charge including, for example, inorganic or organic counterions such as $Na^+$, $K^+$, $Li^+$, $NH_4^+$, $NR'_4^+$, acetate, $NO_3^-$, $SO_4^{-2}$, $OH^-$, and $Cl^-$, where R' represents hydrogen or an organic group such as a substituted or unsubstituted aryl and/or alkyl group. An ionizable group is one that is capable of forming an ionic group in water (not necessarily at pH 7) and is, to some extent, associated with its counterion in a medium of low polarity, unless additives are used to disassociate the counterion. Anionizable groups form anions and cationizable groups form cations. Such groups include those described in U.S. Pat. No. 5,698,016, the description of which is fully incorporated herein by reference.

In certain embodiments, the modified pigment includes a pigment having attached at least one chemical group including an anionic group, which is a negatively charged ionic group. Anionic groups may be generated from groups having ionizable substituents that can form anions, such as acidic substituents, or may be the anion in the salts of ionizable substituents. Representative examples of anionic groups include but are not limited to —$COO^-$, —$SO_3^-$, —$OSO_3^-$, —$HPO_3^-$, —$OPO_3^{-2}$, and —$PO_3^{-2}$. Representative examples of anionizable groups include but are not limited to —COOH, —$SO_3H$, —$PO_3H_2$, —R'SH, —R'OH, and —$SO_2NHCOR'$, where R' represents hydrogen or an organic group such as a substituted or unsubstituted aryl and/or alkyl group. Preferably, the attached group includes a carboxylic acid group, a sulfonic acid group, a sulfate group, a carboxylate group, or salts thereof. For example, the attached group may be an organic group such as a benzene carboxylic acid group, a benzene dicarboxylic acid group, a benzene tricarboxylic acid group, a benzene sulfonic acid group, or salts thereof. Specific organic ionic groups include but are not limited to —$C_6H_4$—$CO_2H$, —$C_6H_4SO_3H$, and salts thereof. The attached organic group may also be a substituted derivative of any of these.

In certain embodiments, the modified pigment includes a pigment having attached at least one chemical group including a cationic group, which is a positively charged organic ionic group that may be generated from ionizable substituents that can form cations (cationizable groups), such as protonated amines. For example, alkyl or aryl amines may be protonated in acidic media to form ammonium groups —$NR'_2H^+$, where R' represent an organic group such as a substituted or unsubstituted aryl and/or alkyl group. Cationic groups may also be positively charged organic ionic groups. Examples include but are not limited to quaternary ammonium groups (—$NR'_3^+$) and quaternary phosphonium groups (—$PR'_3^+$). Here, R' represents hydrogen or an organic group such as a substituted or unsubstituted aryl and/or alkyl group. Preferably, the attached group includes an alkyl amine group or a salt thereof or an alkyl ammonium group.

In certain embodiments, the LTHC layer includes a combination product of a modified pigment and a dispersant in a matrix. By "combination product", we mean the product that results from the combination of the modified pigment and the dispersant. Specific dispersants can be chosen based on the type of modified pigment and the desired overall properties of the dispersion. For example, if the pigment is a modified pigment having an attached organic group, the dispersant may include at least one functional group chosen based on the organic group attached to the pigment. For example, if the modified pigment includes a pigment having attached at least one anionic group, at least one anionizable group, or a mixture of these, it has been found that dispersants including at least one cationic functional group, at least one cationizable functional group, or a mixture of these can be used to produce dispersions. Specific combinations include modified pigments having attached at least one carboxylic acid group, sulfonic acid group, or salt thereof and dispersants including at least one amine group or ammonium group. However, it is also possible, for this type of modified pigment, to produce dispersions with a dispersant including at least one anionic functional group, at least one anionizable functional group, or a mixture of these. Furthermore, if the modified pigment includes a pigment having attached at least one cationic group, at least one cationizable group, or a mixture of these, it has been found that dispersants including at least one anionic functional group, at least one anionizable functional group, or a mixture of these can be used to produce dispersions. Finally, it has also been found that dispersants including at least one nonionic functional group (such as a polyether group) can be used to produce dispersions if the modified pigment includes a pigment having attached at least one ionic group, at least one ionizable group, or a mixture of these.

Exemplary dispersants that may be employed include but are not limited to BYK108, BYK 115, BYK116, BYK161, BYK163, BYK 182 BYK 2150 and BYK2050, all available from BYK Chemie, Solsperse™ dispersants available from Noveon, including 27-000, 32-000, 32-500, 35-140, 38-500, and 39-000, and K-Sperse 504XD, from King Industries, Inc.

The amount of dispersant can be varied depending on the type of modified pigment, the solvent, and the loading level of particulate material. In general, the ratio of the amount of dispersant to the amount of modified pigment can be between about 0.01 to 1 up to about 2.5 to 1, for example, from about 0.1 to 1 up to about 1 to 1 or in any range defined by any two of the endpoints above.

In certain embodiments, the modified pigment is a pigment having an attached polymer. In one embodiment, an oxidized pigment or a pigment that has been modified to attach a particular chemical group, e.g., a carboxylic acid or sulfanilic acid group, is reacted with a polymer, for example, one of the dispersants described above, having a group that readily participates in a chemical reaction, e.g., a condensation reaction, with the chemical groups on the surface of the oxidized or chemically modified pigment.

In another embodiment, the polymer is directly attached to a pigment. For example, a polymer, including polymer dispersants described above, having a primary amine or that has been modified to include a primary amine is introduced to or contacted with the pigment. A sufficient amount of time is provided to adsorb the polymer onto the pigment. After adsorption occurs, a diazonium reaction can be conducted as described in U.S. Pat. Nos. 5,571,311 and 5,630,868, as well as U.S. Pat. No. 5,554,739 and PCT Publication WO-96/18688. Briefly, the polymer is added to the pigment. Polymers may be modified to include a primary amine using known techniques to those skilled in the art, such as esterification involving an aromatic or alkyl group and reduction of nitro groups to the corresponding primary amine groups. Nitration of the polymer followed by reduction, or amination of the polymer, are some other techniques that may be used. Modified pigments having attached polymers may also be combined with dispersants in dispersions.

The amount of attached groups, including polymers, on the modified pigments can be varied depending on the solvent and the desired properties of the dispersion. In certain embodiments, the amount of attached groups is from about 0.001 to about 10.0 micromoles of the group per square meter surface area of pigment (surface area as measured, for example, by nitrogen adsorption), for example, about 0.01 $\mu mol/m^2$ to about 8 $\mu mol/m^2$, about 0.1 $\mu mol/m^2$ to about 7 $\mu mol/m^2$, about 1 $\mu mol/m^2$ to about 5 $\mu mol/m^2$, about 2 $\mu mol/m^2$ to about 9 $\mu mol/m^2$, about 4 $\mu mol/m^2$ to about 6 $\mu mol/m^2$, about 0.1 $\mu mol/m^2$ to about 4 $\mu mol/m^2$, about 1 $\mu mol/m^2$ to about 3 $\mu mol/m^2$, or an amount in any range defined by any two of these endpoints. The amount attached can also be varied depending on the characteristics of the specific attached group such as, for example, the size of the attached group or the functionality of the ionic group. Further, it is also within the scope of the present invention to have more than one type of attached group, such as a non-ionic or non-chargeable group, especially one capable of providing additional steric stabilization, on the modified pigment in order to provide for the best overall performance. In this case, the amount of the ionic or ionizable group is preferably greater than amount of the non-ionic group (on a molar basis).

The modified pigment may be purified by washing, such as by filtration, centrifugation, or a combination of the two methods, to remove unreacted raw materials, byproduct salts, and other reaction impurities. The products may also be isolated, for example, by evaporation, including spray drying, or they may be recovered by filtration and drying using techniques known to those skilled in the art. In addition, the modified pigment can be purified to remove any undesired free species, such as unreacted treating agents used to prepare them. Known techniques of ultrafiltration/diafiltration using a membrane or ion exchange may be used to purify the particulate material and remove a substantial amount of free ionic and unwanted species, if present. Also, an optional exchange of counterions whereby the counterions that form a part of the modified can be exchanged or substituted with alternative counterions (including, e.g., amphiphilic ions) utilizing known ion exchange techniques such as ultrafiltration, reverse osmosis, ion exchange column, etc, may be employed. Particular examples of counterions that can be exchanged include, but are not limited to, $Na^+, K^+, Li^+, NH_4^+, Ca^{2+}, Mg^{2+}, Cl^-, NO_3^-, NO_2^-$, acetate, and $Br^-$.

Dispersions using modified pigments are employed to produce LTHC layers according to certain embodiments of the invention. By "dispersion", we mean a two-phase system including finely divided particles homogeneously distributed throughout a liquid phase. The dispersions include a modified pigment, a solvent and an optional dispersant. The viscosity of the dispersion is low, notwithstanding the loading level of the pigment.

The solvent utilized in the dispersion may have a dielectric constant of at most about 50. Suitable examples include alcohols (such as 1-methyl-2 propanol and methanol), glycols, ethers (such as tetrahydrofuran or diethylether), ketones (such as acetone, methylethyl ketone, or methylbutyl ketone), esters (such as n-butyl propionate), acetates (such as ethyl acetate), amides (such as dimethylformamide), sulfoxides (such as dimethylsulfoxide), hydrocarbons, and miscible mixtures thereof, such as ethylene glycol and methanol. The solvent may also include water. In some embodiments, the solvent is not water alone nor is it a mixture including more than about 50% by weight water. For example, the solvent may be a non-aqueous solvent and may further include less than about 50% by weight water, such as at most about 40%, at most about 30%, at most about 20%, or at most about 10% by weight water, or an amount in any range defined by any two of these endpoints.

The amount of modified pigment present in the dispersion can be varied depending on, for example, the type of modified pigment and the type of solvent. In some embodiments, the dispersions have a high loading of modified pigment. By "high", we mean that the amount of modified pigment is at least about 10% by weight based on the total weight of the dispersion. For example, the loading level of modified pigment may be at least about 10%, at least about 15%, at least about 20%, at least about 25, or at least about 30% by weight based on the total weight of the dispersion. For example, the loading level of modified pigment may be from about 10% to about 55%, from about 15% to about 50%, or from about 30% to about 45%. In alternative embodiments, the loading level of modified pigment is at most about 12%, at most about 10%, or at most about 8%. The loading level of modified pigment may also be in any range defined by any two of the endpoints described above.

The dispersion may further include at least one dispersant which forms associative structures in the solvent. By "associative structures" is meant an organized arrangement of dispersant molecules resulting from the interaction of groups of the dispersant, such as inverse micelles. Examples of suitable dispersants include, but are not limited to, polyalkylene oxides (such as polyethylene oxide or polypropylene oxide), polyesters (such as polycaprolactone, polyvalerolactone, poly(hydroxy stearic acid), or poly(hydroxyoleic acid), polyamides such as polycaprolactam, polyacrylates, and block copolymers having both a hydrophobic and a hydrophilic group. Additional examples include amine-functionalized derivatives (such as polyamine, tertiary amine, or quaternary ammonium functionalized derivatives) or acid functionalized derivatives (such as carboxylic acid or phosphonic acid functionalized derivatives) of these, such as amine-functionalized or amine-terminated polyalkylene oxides or acrylic polymers including amine or acid functional groups. Other suitable dispersants will be known to one skilled in the art or could be identified by adding the dispersant to the solvent above its critical micelle concentration (CMC) and determining if associative structures, such as inverse micelles, have formed. Particularly preferred are those dispersants that not only form associative structures in the solvent but also form such structures in the dispersion itself—i.e., in the presence of the modified pigment. Formation of associative structures, for example, by dispersants or polymer groups attached to a pigment, can impart improved properties, such as stability and low viscosity, to high loading dispersions, even when the level of dispersant (when used) is high. Techniques such as light scattering methods known to one skilled in the art can be used to detect the presence of such structures in either the solvent or in the dispersion.

In certain preferred embodiments, stable dispersions are formed. By "stable", we mean that the dispersion properties do not change appreciably over time and/or with changes in a specific condition, for example, temperature. The dispersion of modified pigment remains a dispersion.

In some embodiments, the particle size of the modified pigment in the dispersion is at most about 500 nm, preferably at most about 300 nm, more preferably at most about 200 nm, for example, at most about 150 nm. Particle size may be measured by dynamic light scattering (DLS), using instruments known to those of skill in the art, for example, particle size analyzers available from Microtrac Inc. (Montgomeryville, Pa.) and Malvern Instruments Ltd. (Malvern, Worcestershire, UK). If the pigment is a carbon black based pigment, the particle size is the aggregate particle size. Preferably, the particle size does not change appreciably over time or with variations in temperature, such as elevated temperatures, including greater than about 70° C., greater than about 80° C., or greater than about 90° C. Preferably, the change in average particle size is less than about 10% and more preferably less than about 5% over one week at temperatures greater than 70° C. We have found that dispersions according to various embodiments exhibit these characteristics even at the high particulate material loading levels described above.

Alternatively or in addition, the dispersion does not develop high levels of precipitate over time. Thus, the solids level of the dispersion remains essentially unchanged. In some embodiments, it has been found that the solids level does not change by more than about 10% and, in some preferred embodiments, by less than about 5% over four weeks at room temperature or two weeks at temperatures greater than 70° C.

It has further been found that such dispersions can be formed having a viscosity that is at most about 50 cP, even when the modified pigment loading level is high, including more than about 10% by weight. In certain embodiments, the viscosity is at most about 40 cP, about 30 cP, about 20 cP, about 10 cP, or about 5 cP.

The dispersions can be prepared using any method known in the art. For example, the modified pigment and solvent may be combined with agitation to produce a stable dispersion, and, if used, a dispersant may be added. Also, if the modified pigment is dispersible in water, the aqueous solvent of this dispersion of the modified pigment may be exchanged for the solvent of the dispersion. Exemplary solvent exchange methods include diafiltration/ultrafiltration and addition of the solvent during evaporation of the aqueous solvent. Alternatively, if a dispersant is used, this can be combined with the modified pigment, and the resulting combination can then be combined with the solvent. The modified pigment, optional dispersant, and solvent may be combined in any equipment known in the art, such as a media or ball mill, or other high shear mixing equipment. Various conventional milling media can be used. Other methods for forming the dispersion will be known to one skilled in the art.

The dispersions may be further purified or classified to remove impurities and other undesirable free species which can co-exist in the dispersion as a result of the manufacturing process. For example, the dispersions can be subjected to a classification step, such as filtration, microfiltration, or centrifugation, to substantially remove particles having a size above about 1.0 micron.

The dispersion is used to prepare the LTHC layer of a donor element for laser-induced thermal imaging by combining the dispersion with other components to form an uncured LTHC layer composition. These components include a matrix precursor, such as a curable resin, a polymer, an oligomer, a monomer, or mixtures of any of these.

A resin, as used herein, is any of a class or solid or semisolid organic products of natural or synthetic origin, generally of high or indefinite molecular weight with no definite melting point. Resins are generally polymeric. Oligomers are low molecular weight polymers at least one of whose chemical, mechanical or other properties exhibit a substantial change when an additional monomer is added to the polymer chain.

The uncured LTHC layer composition may also include conventional cosolvents such as butyl acetate, ethylcellosolve, ethylcellosolve acetate, butylcellosolve, butylcellosolve acetate, ethylcarbitol, ethylcarbitol acetate, diethyleneglycol, cyclohexanone, propyleneglycol monomethylether, propyleneglycol monomethylether acetate, lactate esters, and mixtures thereof. Aqueous solvents may also be added, including, for example, water and water soluble alcohols, but the amount of water will be below 50% by weight.

The matrix precursor may include any curable resin known in the art. Exemplary cured resins include but are not limited to phenolic resins, e.g., epoxy bisphenol-A resin or epoxy novolac resin, acrylic resins, methacrylic resins, polystyrene resins, styrene-acrylic resins, poly vinyl butyral, urethane resins, or polyolefin resins. The curable resin is one that may be cured thermally or by any source of radiation such as, for example, ultraviolet radiation. Likewise, polymers, oligomers, and monomers in the composition may be thermally or radiation polymerizable or cross-linkable. For example, monomers or oligomers of these resins or other resins or polymers, such as polyesters, acrylates, methacrylates, epoxides, terminal alkenes, diisocyanates, diols, diamines and styrenics, may be included in the uncured LTHC layer composition in addition to or as alternatives to the cured resins listed above. Prepolymers for polyurethanes and polyureas, such as hydroxyl-, amine-, or isocyanate-terminated oligomers, may also be employed. In this way, the uncured LTHC layer composition may be photosensitive (i.e. may be cured by irradiation) or thermosensitive (i.e., may be cured by changing temperature, such as by heating). When the components of the uncured LTHC layer composition are curable by irradiation, the uncured LTHC layer composition may further include a photoinitiator, which generates a radical on absorbing light.

The curable resin, polymer, monomer, or oligomer may be chosen to be compatible (i.e., form a one-phase combination) with the other materials of the uncured LTHC layer composition. A solubility parameter can be used to indicate compatibility, as discussed in *Polymer Handbook*, J. Brandrup, ed., pp. VII 519-557 (1989), incorporated herein by reference. In some embodiments, a thermoplastic resin may have a solubility parameter in the range of 9 to 13 $(cal/cm^3)^{1/2}$, e.g., 9.5 to 12 $(cal/cm^3)^{1/2}$. The solubility parameter may also be employed to optimize the choice of modification for the pigment, the solvents and optional dispersants employed in the uncured LTHC layer composition, or any other material used to form the LTHC layer.

In certain preferred embodiments, the uncured LTHC layer composition is cured by irradiation in the ultraviolet region of the spectrum (100-400 nm). In these embodiments, the modified pigment preferably exhibits lower absorption in the ultraviolet than in the infrared (720-1100 nm).

The LTHC layer can be formed with a minimum of additional components (additives and/or cosolvents) and processing steps. However, additives such as surfactants and cosolvents may also be included. For example, when a photosensitive resin is used, such as epoxy bisphenol-A or epoxy novolak, a photoinitiator can also be added. One or more monomers, oligomers, and polymers may also be employed. In certain preferred embodiments, the uncured LTHC layer composition can be cured by exposure to UV light (e.g., from a hydrogen or deuterium source) for about 10-20 s at about 100° C. The LTHC layer is preferably stable with respect to an MEK rub.

The uncured LTHC layer composition may also be stable with respect to storage. In certain embodiments, the particle size distribution and or the viscosity does not vary by more than about 10% after accelerated aging by incubation at 70° C. for seven days. Alternatively or in addition, the amount of solids in the composition does not vary by more than about 5% under similar conditions.

In certain embodiments, the uncured LTHC layer composition has very low viscosity. As a result, the composition may be disposed on a substrate using microgravure printing, spin coating, gravure coating, web coating, dip coating, slit coating, slot coating, or and other techniques that spread a thin layer of fluid on a surface. In preferred embodiments, the uncured LTHC layer composition is self leveling, which reduces the formation of irregularities in the final coating and increases smoothness. Self-leveling behavior describes a liquid film's ability to flow by maintaining low viscosity and yield stress (the stress beyond which a material is no longer in the linear elastic region of the stress strain curve) as the solid loading level increases during the drying process. Uncured LTHC layer compositions containing modified pigments maintain flow at increased solid loading levels, thus enabling self-correction of both imperfections and potential defects in the final film and resulting in smoother, more uniform coatings.

Preferably, the uncured LTHC layer composition maintains self-leveling behavior as solvent is removed until the matrix material begins to cure, e.g., at the point where the elastic modulus (G', also called the storage modulus) of the curable coating composition is greater than the loss modulus (G"), a measure of the energy lost by viscous dissipation in a material when mechanical work is applied. The proportion of modified pigment in the uncured LTHC layer composition can increase by 50% or more as the solvent is removed from the curable coating composition. Preferably, the uncured LTHC layer composition retains the ability to flow, enabling surface roughness that develops during drying to smooth out. In contrast, the yield strength of dispersions containing unmodified pigments is much higher, accelerating the point during drying at which the uncured coating composition is unable to flow to correct any surface roughness or other defects that may develop (see, for example, FIGS. 1 and 2). In certain embodiments, the use of a modified pigment provides at least a 10 percentage point improvement, for example, at least a 15 percentage point improvement or at least a 20 percentage point improvement, e.g., between a 10 and 20 or between a 13 and 17 point improvement, or an improvement in any range defined by any of the endpoints above, in the weight percent loading for which self-leveling behavior is observed with respect to the use of an unmodified pigment. That is, the viscosity of a composition including an unmodified pigment dramatically increases with respect to the proportion of carbon black at a loading level far less than the viscosity of an uncured LTHC layer composition according to preferred embodiments of the invention.

Lower viscosity uncured LTHC layer compositions facilitate the production of thinner LTHC layers, which in turn facilitate the deposition of materials in higher resolution patterns. Even for lower resolution patterns, use of a thinner LTHC layer reduces the lateral diffusion of heat across the LTHC layer. Thus, in certain embodiments, materials may be deposited in patterns with sharper edges, e.g., lower line edge roughness. For example, the line edge roughness of a transferred material may be from about 5 to about 8 micrometers or less.

The uncured LTHC layer composition is cured to form the LTHC layer. The LTHC layer may be from about 0.05 to about 20 micrometers thick, for example, from about 0.5 to about 10 micrometers, from about 1 to about 7 micrometers thick, from about 1 to about 4 micrometers thick, or in any range defined by any two of these endpoints. Preferably, the LTHC layer is from about 1 to about 4 micrometers thick. In preferred embodiments, the LTHC layer has a surface roughness of at most about 1%, at most about 2%, at most about 5%, at most about 7%, for example, about 4%, as measured as the standard deviation from the median of a scan line taken over a portion of the surface by a profilometer.

The loading level of the modified pigment in the LTHC layer may be from about 1 wt % to about 30 wt %, for example, from about 3 wt % to about 20 wt % or about 5 wt % to about 15 wt %, or in any range defined by any of these endpoints. The loading level is preferably high enough to achieve the desired optical density but low enough to minimize light scattering from the modified pigment during curing (for light-curable matrices) or during irradiation in the course of thermal transfer. Without being bound by any particular theory, it is believed that agglomeration of the modified pigment particles, for example, by flocculation, local phase separation, sedimentation, network formation, or creaming, will cause the aforementioned light scattering in the LTHC layer. Again without wishing to be bound by any particular theory, it is further believed the use of modified pigment reduces agglomeration as compared to unmodified pigments, resulting in decreased viscosity and improved flow behavior of the uncured LTHC layer composition.

As discussed above, the LTHC layer may be a component of a donor element for laser-induced thermal transfer (LITT). Exemplary substrate materials for use in a donor element include but are not limited to polyesters, e.g., polyethylene terephthalate and polyethylene naphthalate, polyamides, polycarbonates, fluoropolymers, polyacetals, and polyolefins. An adhesion layer may optionally be disposed on this to aid adhesion of the LTHC layer. The material for the LTHC layer may be deposited by any film coating method known to those of skill in the art, e.g., roll coating, gravure, extrusion, spin coating, or knife coating. The low viscosity of the materials used to produce the LTHC layer according to certain embodiments of the present invention enables the use of microgravure printing for production of the LTHC layer. Microgravure printing enables the production of thinner films and facilitates the production of more flexible donor elements.

A transfer layer may be deposited directly on the LTHC layer or over an interlayer disposed on the LTHC layer. In some embodiments, the interlayer may absorb or reflect at least a portion of the imaging radiation to abate damage to the transfer layer or the receiving substrate that may result from exposure to the imaging radiation. The interlayer may also influence the adhesion of the transfer layer to the donor element. The interlayer may have high thermal resistance and may also resist thermal or light induced geometrical or chemical changes during imaging. The interlayer need not be transferred with the transfer layer and may act as a barrier to the transfer of materials between the transfer layer and the LTHC layer. Exemplary interlayer materials include but are not limited to polymers, inorganic materials, and polymer/inorganic composites. Inorganic materials may include but are not limited to metals, metal oxides, metal sulfides, and inorganic carbon. Manufacturing methods, materials, and additional description of interlayers for use in LITT are further described in U.S. Pat. No. 6,190,826. Both thermoplastic and thermosetting polymers are appropriate for use as an interlayer material. Additives such as photoinitiators, surfactants, pigments, plasticizers, and coating aids may also be included. The thickness of the interlayer may depend on a variety of factors, e.g., the interlayer material(s), the composition of the LTHC layer, the transfer layer material, the wavelength of the imaging radiation, and the energy of the irradiation (e.g., the intensity and length of the irradiation).

A release layer may be further interposed between the LTHC layer or the interlayer and the transfer layer. Such a layer may facilitate release of the transfer layer from the donor element and, alternatively or in addition, may enhance adhesion of the transfer layer to the donor layer prior to imaging. Exemplary release layer materials include but are not limited to electrically conductive and non-conductive thermoplastic polymers, electrically conductive and non-conductive filled polymers, electrically conductive and non-conductive dispersions, and sublimable insulating and semi-conducting materials. The release layer material may be retained on the donor element or transferred with the transfer layer. Sublimable materials are especially suited for transfer with the transfer layer.

The transfer layer may include one or more layers to be transferred to the receiving substrate. Any of the layers within the transfer layer may be formed from organic, inorganic, organometallic, or other materials, or mixtures or blends of materials. It is not necessary that the layers of the transfer layer be discrete. There may be interfacial regions where materials from adjacent layers intermix or diffuse into one another, before, during, or after imaging. Indeed, some interfacial interactions may be desired, and the transfer layer may be fabricated to promote those interactions between layers.

The transfer layer may include materials for a variety of applications, including displays (e.g., for electronic devices such as televisions, computers, personal digital assistants, etc.), "lab on a chip" devices, and electronics. For example, the transfer layer may include materials for a color filter, organic light emitting diode (OLED), black matrix, or an alignment layer for a liquid crystal display. The transfer layer may include materials for use as sensors, analytes, etc., in lab on a chip devices. In another embodiment, the transfer layer may include materials for a transparent cathode for electronic applications.

In some embodiments, the transfer layer includes materials for one or more active layers (i.e., a layer that acts as a conducting, semiconducting, electron blocking, hole blocking, light producing (e.g., luminescing, light emitting, fluorescing, or phosphorescing), electron producing, or hole producing layer) for an electronic device. Alternatively or in addition, the transfer layer may include materials for one or more operational layers (i.e., a layer that acts as an insulating, conducting, semiconducting, electron blocking, hole blocking, light producing, electron producing, hole producing, light absorbing, light reflecting, light diffracting, phase retarding, light scattering, light dispersing, or light diffusing layer) for an electronic device. Alternatively or in addition, the transfer layer may include materials for one or more non-operational layers (i.e., a layer that does not perform a function in the operation of an electronic device, but serves an alternative function, such as facilitating manufacture or regulating diffusion of materials among layers).

In another embodiment, the transfer layer may include a biologically active material, e.g., compounds or entities that alter, inhibit, activate, or otherwise affect biological or biochemical events, including both naturally occurring and synthetic materials. Such biologically active materials may be used to prepare devices for "lab on a chip" applications, e.g., sensors and microreactors.

The transfer layer may include a material used to produce one or more components of an LCD display, including for example, a color filter, a black matrix, an alignment layer, or a transparent electrode. For color filter applications, a dye and/or pigment is present in the transfer layer as the imageable component. The imageable component(s) for color filter applications may be chosen such that optical densities on the receiving substrate in areas where material has been transferred are between 1.0 and 2.0 for red, blue and green, and between 3.0 and 4.0 for black. To produce a black matrix, a black pigment, such as a carbon black or a modified carbon black, may be present in the transfer layer.

The alignment layer provides a well-defined alignment to the liquid crystals in a display. Alignment layers may be produced from organic or inorganic materials. The use of LITT to produce alignment layers may obviate rubbing or other manufacturing steps that can introduce particulates or other contaminants into a device. Exemplary materials for use in alignment layers include polyimides, among others.

Transparent electrodes find utility in a wide variety of electronic applications in addition to LCDs and OLEDs. For example, transparent electrodes are employed in energy saving windows and in solar panels. Exemplary transparent electrode materials include metal oxides such as aluminum or gallium doped zinc oxide, indium oxide, tin oxide, and combinations and compounds of these such as indium tin oxide (ITO), diamond thin films, single wall carbon nanotubes, and intermetallics such as TiW.

The various layers may be added to the donor element using any deposition technique known to those of skill in the art. Exemplary deposition techniques include but are not limited to printing techniques, e.g., gravure printing, spin coating, spray coating, sputter coating, evaporative coating, chemical vapor deposition, electron beam deposition, extrusion coating, sol-gel techniques, etc.

The present invention will be further clarified by the following examples which are intended to be only exemplary in nature.

EXAMPLES

Example 1

Preparation of a Dispersion 28.8 g of a modified pigment including a carbon black having attached sulfonic acid groups (prepared according to the procedure in U.S. Pat. No. 5,707,432 using 6 μmol/m² sulfanilic acid and Regale 250 carbon black, available from Cabot Corporation, and drying down the resulting aqueous dispersion), 15.0 g Solsperse 32500 (an amine-functionalized dispersant available from Noveon), 94 g Dowanol PM (available from Dow) as solvent, 7.5 g tri(propylene glycol) diacrylate, and 15 g pentaerythritol triacrylate were metered into a vessel. To this was added 2 mm glass beads, and a dispersion was prepared by mixing for two hours on a Skandex mixer. The glass beads were removed using a paint strainer. The viscosity of the dispersion (18% modified pigment loading) was measured using a Brookfield viscometer (spindle 18) and found to be 6.48 cP at 100 RPM. The mean volume particle size (mV) of the particulate material in the dispersion was measured using a Microtrac® Particle Size Analyzer and found to be 0.074 μm.

Example 2

Preparation of a Dispersion 8.8 g of the modified pigment employed in Example 1, 4.5 g Solsperse 32500 (an amine-functionalized dispersant available from Noveon), 28.9 g Dowanol PM (available from Dow) as solvent, 2.3 g tri(propylene glycol) diacrylate, and 4.5 g pentaerythritol triacrylate were metered into a vessel. To this was added 2 mm glass beads, and a dispersion was prepared by mixing for two hours on a Skandex mixer. The glass beads were removed using a paint strainer. The viscosity of the dispersion (18% modified pigment loading) was measured using a Brookfield viscometer (spindle 18) and found to be 6.48 cP at 100 RPM. The mean volume particle size (mV) of the particulate material in the dispersion was measured using a Microtrac® Particle Size Analyzer and found to be 0.074 μm.

Example 3

Preparation and Aging Test of a Dispersion 20 g of the modified pigment employed in Example 1, 4 g Solsperse 20000 (an amine-functionalized dispersant available from Noveon), and 100 g methanol as solvent were metered into a vessel. To this was added 2 mm glass beads, and a dispersion was prepared by mixing for six hours on a Skandex mixer. The glass beads were removed using a paint strainer. The viscosity of the dispersion (16% modified pigment loading) was measured using a Brookfield viscometer (spindle S00) and found to be 18.0 cP at 100 RPM. The sample was subjected to accelerated aging at 50° C. for 36 hours, and the viscosity after accelerated aging was found to be 19.0 cP.

Example 4

Preparation and Let-Down of a Highly Concentrated Dispersion 24.14 g of the modified pigment employed in Example 1, 11.9778 g Disperbyk 163, and 43.9915 g methyl ethyl ketone as solvent were metered into a vessel. To this was added 2 mm glass beads, and a dispersion was prepared by mixing for two hours on a Skandex mixer. The glass beads were removed using a paint strainer. The viscosity of the dispersion (30% modified pigment loading) was measured using a Brookfield viscometer (spindle S18) and found to be 4.5 cP at 100 RPM. The volume average diameter of the particles were measured on a Microtrac and found to be 0.1795 μm. 10 g of the modified pigment concentrate was let down with 10 g of CD501, a triacrylate available from Sartomer. No flocculation was observed.

Example 5

Preparation of a Highly Concentrated Dispersion 25.0 g the modified pigment employed in Example 1, 12.5 g Disperbyk 163, and 62.5 g Dowanol PMA as solvent were metered into a vessel. To this was added 2 mm glass beads, and a dispersion was prepared by mixing for two hours on a Skandex mixer. The glass beads were removed using a paint strainer. The viscosity of the dispersion (25% modified pigment loading) was measured using a Brookfield viscometer (spindle S18) and found to be 7.8 cP at 100 RPM. The volume average diameter of the particles were measured on a Microtrac and found to be 0.165 µm. The sample was subjected to accelerated heat aging. The viscosity was measured using a Brookfield viscometer (spindle S18) and found to be 6.0 cP at 100 RPM. The volume average diameter of the particles was measured on a Microtrac and found to be 0.146 µm.

Example 6

Preparation of a Highly Concentrated Dispersion 9.98 g of the modified pigment employed in Example 1, 2.12 g Tergitol L-61 (a non-ionic polyether polyol dispersant available from Noveon), and 100 g methanol as solvent were metered into a vessel. To this was added 2 mm glass beads, and a dispersion was prepared by mixing one hour on a Skandex mixer. The glass beads were removed using a paint strainer. The viscosity of the dispersion (9% modified pigment loading) was measured using a Brookfield viscometer (spindle S00) and found to be 2.5 cP at 100 RPM.

Example 7

Preparation and Aging Test of a Dispersion 8.88 g of a modified pigment including a carbon black having attached sulfonic acid groups (prepared according to the procedure in U.S. Pat. No. 5,707,432 using 6 µmol/m² sulfanilic acid and Regal® 330 carbon black and drying down the resulting aqueous dispersion), 0.82 g Solsperse 20000 (an amine-functionalized dispersant available from Noveon), and 40.84 g methanol and 49.5 g ethylene glycol as solvent were metered into a vessel. To this was added 2 mm glass beads, and a dispersion was prepared by mixing two hours on a Skandex mixer. The glass beads were removed using a paint strainer. The mean volume particle size (mV) of the particulate material in this dispersion (9% modified pigment loading) was measured using a Microtrac® Particle Size Analyzer and found to be 0.015 µm. The sample was subjected to accelerated heat aging at 50° C. for 3 days, and the mean volume diameter particle size was found to be 0.15 µm. Similar properties resulted when the ethylene glycol solvent was excluded. Therefore, it would be expected that, if the amount of modified pigment was increased to 10% loading in this formulation, similar results would also be observed.

Example 8

Surface Roughness 26.99 g of the modified pigment employed in Example 1, 13.49 g Disperbyk 163 and 49.29 g methyl ethyl ketone as a solvent were metered into a vessel. To this was added 2 mm glass beads, and a dispersion was prepared by mixing four hours on a Skandex mixer. The glass beads were removed using a paint strainer. 10 g of this dispersion was let down with 16.2 g of Joncryl 611 (available from BASF). The let down dispersion was solution spun onto a glass wafer. Surface roughness measurements were performed using a KLA Tencor Alpha Step 500 surface profilometer. Approximately 6 mg of force was applied to a thin film which had been intentionally scratched with a razor to uncover the base substrate. The profilometer then tracked the surface roughness over 2 mm, at a rate of 200 µm/s. Three measurements taken from three separate scratches at different points on the film were averaged to yield a surface roughness for the film (4% surface roughness).

Example 9

Flow Behavior of Mixtures with a Low Structure Carbon Black

Figure 2:
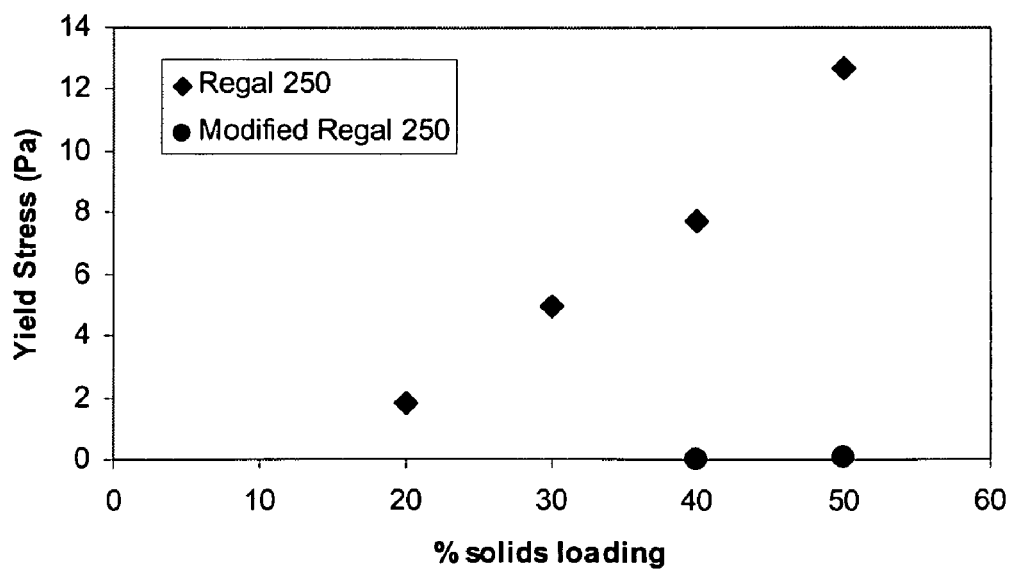
FIG. 2 is a graph showing the yield stress with respect to loading level for modified and unmodified Regal® 250 carbon black in solvent.
Figure 3:
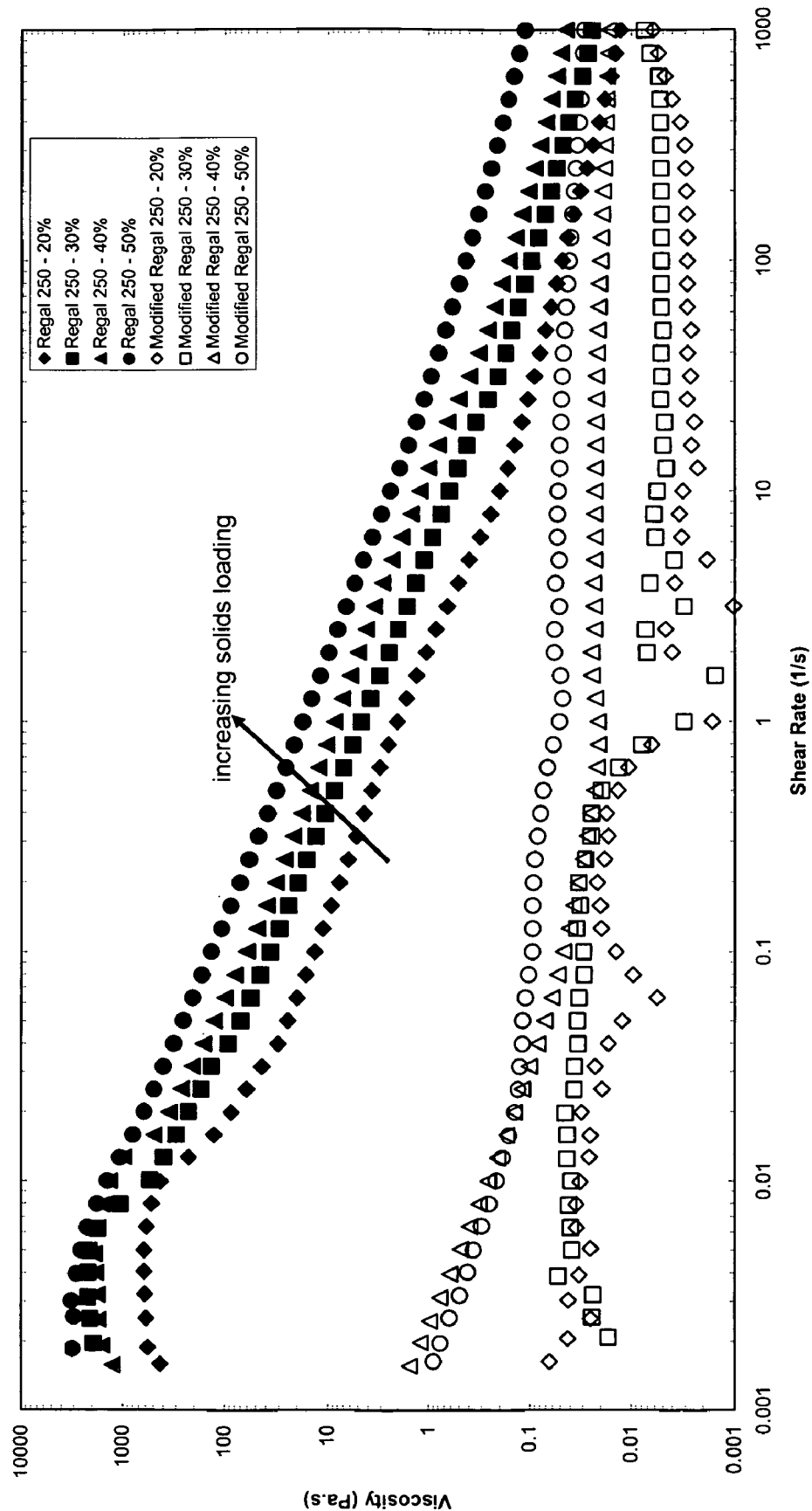
FIG. 3 is a graph showing the viscosity with respect to shear rate for various loading levels of modified and unmodified Regal® 250 carbon black in solvent.

Dispersions were prepared with the modified carbon black of Example 1 and Regal® 250 carbon black in propylene glycol methyletheracetate (PGMEA). The ratio of dispersant (BYK 163) to pigment was 0.3 by weight. Dispersions containing 20, 30, 40, and 50% by weight of carbon black were mixed as described in Example 4. The viscosity of the dispersions was measured as described in Example 6. The dispersions were analyzed with a rheometer (ARG2, TA Instrument Ltd Rotational Rheometer) and its software interface (TA Rheology Advantage) to measure the storage and loss moduli, yield strength, and viscosity. FIGS. 1 and 2 show the viscosity and yield stress, respectively, for mixtures including the modified and unmodified pigment. FIG. 3 shows the variation of the dependence of viscosity on shear rate with loading for both modified and unmodified pigment. The advantage of the modified carbon black over the unmodified carbon black is clear. Mixtures with modified carbon blacks maintain low viscosity behavior (<1 Pa·s) and low yield stress behavior (<1 Pa) with upwards of 50 wt % modified pigment, while the mixture with unmodified pigment exhibits a dramatic increase in viscosity and yield stress at only 20 wt % carbon black.

Example 10

Flow Behavior of Mixtures with an Oxidized High Structure Carbon Black

Figure 4:
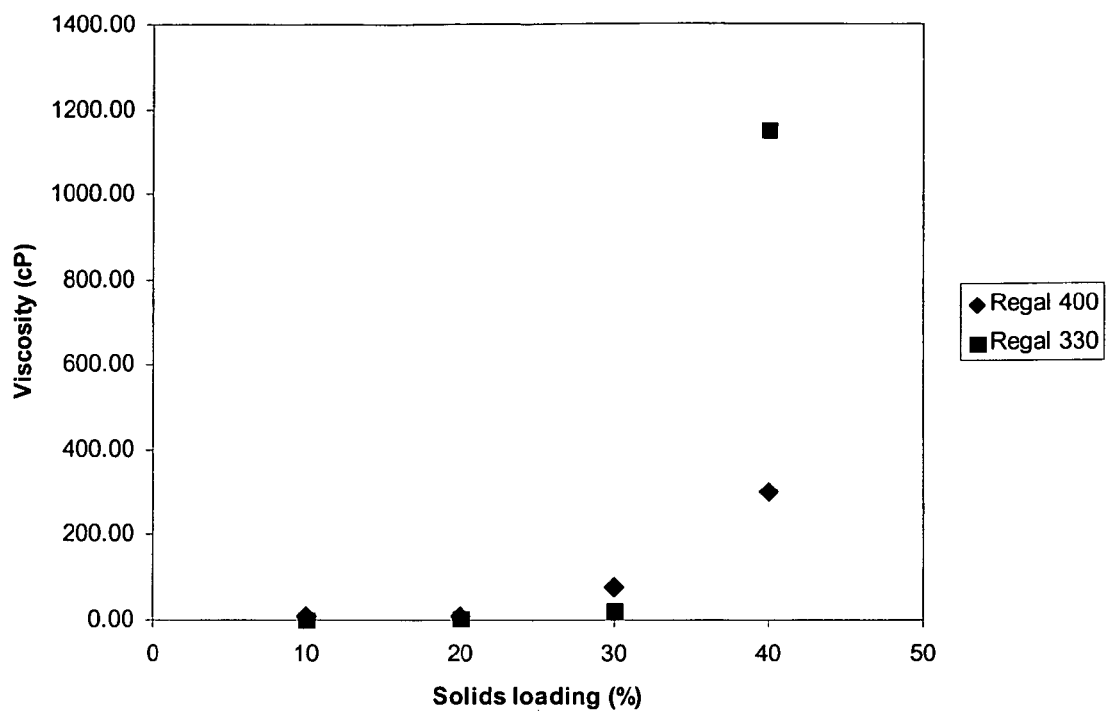
FIG. 4 is a graph showing the viscosity with respect to loading level for an oxidized and an unoxidized carbon black in solvent.

Dispersions were prepared with Regal® 400 carbon black, an oxidized carbon black available from Cabot Corporation, and Regal® 330 carbon black, an unoxidized carbon black available from Cabot Corporation and having a similar morphology, in methyl ethyl ketone (MEK). The ratio of dispersant (Solsperse 32000) to pigment was 1:2 by weight. Dispersions containing 10, 20, 30, and 40% by weight of carbon black were mixed as described in Example 4. The viscosity of the dispersions was measured as described in Example 6. FIG. 4 shows that the viscosity of mixtures including the unoxidized carbon black increases much more quickly with the weight percent of pigment in the mixture than the viscosity of mixtures incorporating the oxidized carbon black.

Example 11

Flow Behavior of Mixtures with a Modified High Structure Carbon Black

Figure 5:
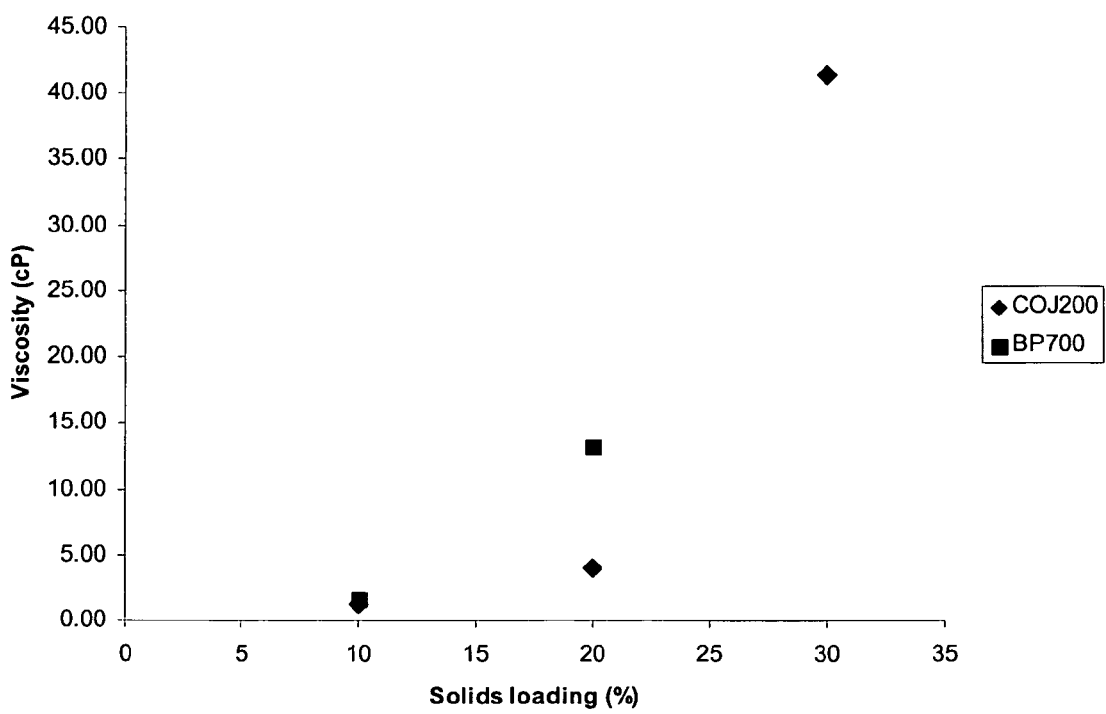
FIG. 5 is a graph showing the viscosity with respect to loading level for a modified and unmodified carbon black in solvent.

Dispersions were prepared with Cab-O-Jet® 200 colored pigment dispersion, a modified pigment having attached sulfonic acid groups (available from Cabot Corporation, dried down for use herein), and Black Pearls® 700 carbon black (available from Cabot Corporation) in MEK. The ratio of dispersant (Solsperse 32000) to pigment was 1:2 by weight. Dispersions containing 10, 20, 30, and 40% by weight of pigment were mixed as described in Example 4. The viscosity of the dispersions was measured as described in Example 6. FIG. 5 shows that the viscosity of mixtures including the unmodified carbon black increases much more quickly with the weight percent of pigment in the mixture than the viscosity of mixtures incorporating the modified pigment.

Example 12

Flow Behavior of Mixtures with a Modified Pigment

Figure 6:
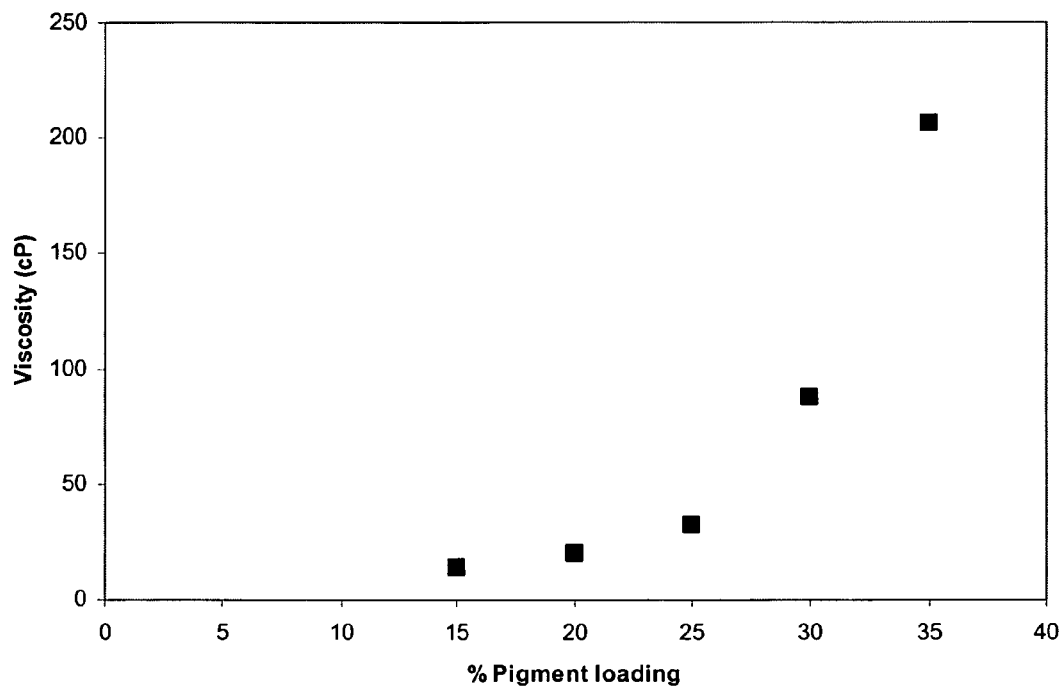
FIG. 6 is a graph showing the viscosity with respect to loading level for modified Pigment Blue 15:6 in solvent.

Dispersions were prepared with PABA (para-amino benzoic acid)-treated Pigment Blue 15:6 (available from DSK) (produced using 2 mmol/g of PABA and a stoichiometric amount of sodium nitrite, the final product was treated with acid to convert the modified pigment to acid form) in diethylene glycol monobutyl ether (DEGBE). The ratio of dispersant (BYK 2150) to pigment was 1:4 by weight. Dispersions containing 15, 20, 25, 30, and 35% by weight of pigment were mixed as described in Example 4. The viscosity of the dispersions was measured as described in Example 6. FIG. 6 shows that the viscosity of mixtures including the modified pigment increases slowly until the pigment loading in the mixture reached about 25 wt %.

Example 13

Flow Behavior of Mixtures with a Modified Pigment

Figure 7:
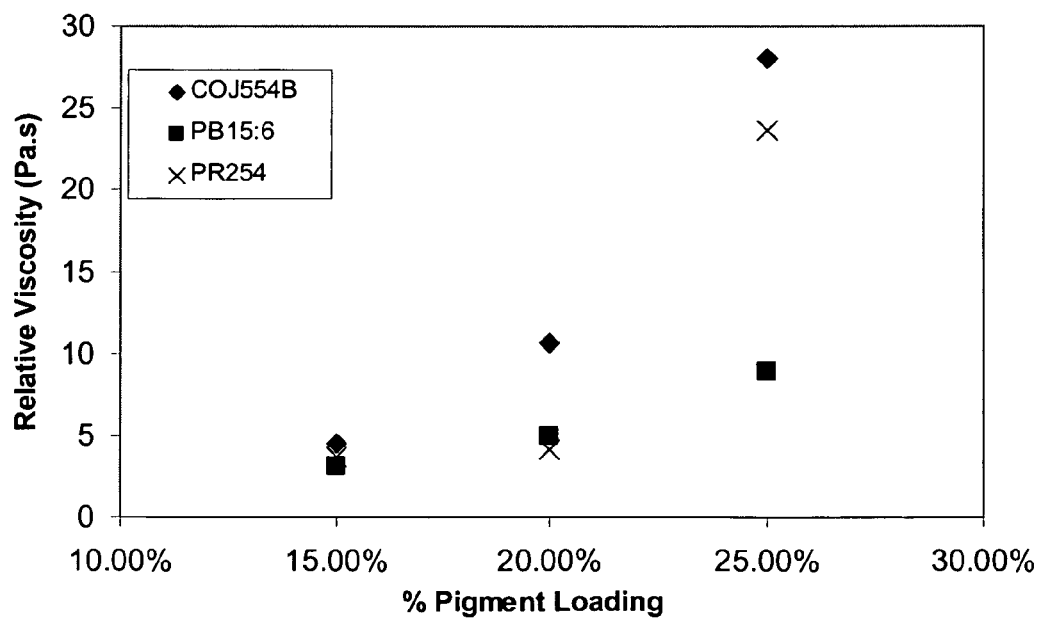
FIG. 7 is a graph showing the viscosity with respect to loading level for three modified pigments in solvent.

Dispersions were prepared with Cab-O-Jet® 554B colored pigment dispersion (dried down for use herein), a violet pigment having attached sulfonic acid groups, sulfonic acid-treated Pigment Red 254 (Ciba) (treated with 6 mmol/g sulfanilic acid, sonicated for four hours, centrifuged, followed by calcium ion exchange to prepare the sulfonate salt form of the modified pigment), and PABA-treated Pigment Blue 15:6 (prepared as in Example 12) in DEGBE. The ratio of dispersant (Disperbyk 2150) to Cab-O-Jet 554B was 1:1.7. The ratio of dispersant (Solsperse 32500) to modified Pigment Red 254 was 1:3.3. The dispersant and ratio with respect to modified pigment for the modified Pigment Blue 15:6 was as in Example 12. Dispersions containing 15, 20, and 25% by weight of pigment were mixed as described in Example 4. Rheological measurements were conducted as described for Example 9 and is shown in FIG. 7. The relative viscosity for mixtures incorporating modified pigments did not increase significantly until the pigment loading level reached about 25 wt %. In contrast, mixtures incorporating unmodified red pigments exhibit dramatic increases in viscosity at about 13 wt % pigment (Compagnon, Maxime (2006). Ink-Jet Printing of Color Optical Filters for LCD Applications. http://urn.kb.se/resolve?urn=urn:nbn:se:du-2244, 2008 Jun. 24, page 37).

Comparative Example 1

17 g Regal® 250 carbon black (commercially available from Cabot Corporation), 3.06 g Tergitol L-61 (a non-ionic polyether polyol available from Noveon), and 100 g ethylene glycol as solvent were metered into a vessel. To this was added 2 mm glass beads, and, upon mixing, a paste was formed. Thus, while the loading level was similar to that of Examples 1-12 (14% pigment loading), no dispersion having low viscosity resulted.

Comparative Example 2

26.87 g Regal® 250 carbon black (commercially available from Cabot Corporation), 13.44 g Disperbyk 163, and 49.27 g methyl ethyl ketone as solvent were metered into a vessel. To this was added 2 mm glass beads, and a dispersion was prepared by mixing four hours on a Skandex mixer. 10 g of this dispersion was let down with 16.2 g of Joncryl 611. The let down dispersion was solution spun onto a wafer and the surface roughness was measured using a profilometer (10% surface roughness).

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A light to heat conversion (LTHC) layer, comprising:
   a combination product of a dispersant and a modified pigment comprising a pigment having attached at least one organic group comprising an ionic or an ionizable group; and
   a matrix in which the combination product is disposed, wherein the LTHC layer is at most 4 micrometers thick and has a surface roughness of at most 7%.

2. The LTHC layer of claim 1, wherein the matrix comprises a polymer or a resin, or both.

3. The LTHC layer of claim 1, wherein the LTHC layer comprises from 10% to 55% of the modified pigment by weight.

4. The LTHC layer of claim 1, wherein the pigment is a carbonaceous pigment or a colored pigment.

5. The LTHC layer of claim 1, wherein the pigment is a carbon black.

6. The LTHC layer of claim 1, wherein the organic group comprises at least one carboxylic acid group, at least one sulfonic acid group, a salt of either of the above, or at least one a hydroxyl group.

7. The LTHC layer of claim 6, wherein the organic group is a —$C_6H_4$—COOH group, a —$C_6H_4$—$SO_3$H group, or a salt of either of the above.

8. The LTHC layer of claim 1, wherein the LTHC layer has an optical density from 0.2 to 3 at a predetermined wavelength.

9. The LTHC layer of claim 8, wherein the predetermined wavelength is in the infrared portion of the electromagnetic spectrum.

10. A thermal transfer donor element, comprising:
    an LTHC layer having a thickness of at most 4 micrometers and a roughness of at most 7%, the LTHC layer comprising:
    a combination product of a disperant with a modified pigment comprising a pigment having attached at least one organic group comprising an ionic or an ionizable group; and
    a matrix in which the combination product is disposed.

11. The thermal transfer donor element of claim 10, further comprising a substrate supporting the LTHC layer.

12. The thermal transfer donor element of claim 11, further comprising an adhesion layer disposed between the substrate and the LTHC layer.

13. The thermal transfer donor element of claim 10, further comprising a transfer layer.

14. The thermal transfer donor element of claim 13, further comprising an interlayer disposed between the transfer layer and the LTHC layer.

15. The thermal transfer donor element of claim 13, wherein the transfer layer comprises a biologically active material, a material for a color filter, a material for a black matrix, a material for an organic light emitting diode, a material for an alignment layer for a liquid crystal display, or a material for a transparent electrode.

16. A thermal transfer donor element produced by a method comprising:
providing a substrate;
combining a modified pigment concentrate, a solvent and a matrix precursor comprising one or more of at least one monomer, at least one oligomer, at least one polymer, and at least one resin to form a mixture, wherein the modified pigment concentrate comprises a combination product of a dispersant with a modified pigment comprising a pigment having attached at least one organic group comprising an ionic or an ionizable group;
disposing the mixture over the substrate; and
removing the solvent from the disposed mixture to form a modified pigment-containing layer having a thickness of at most 4 micrometers and a roughness of at most 7%.

17. The thermal transfer donor element of claim 16, wherein the method further comprises curing the matrix precursor to form a matrix in which the combination product is dispersed.

18. The thermal transfer donor element of claim 17, wherein curing comprises irradiating the mixture at a predetermined wavelength.

19. The thermal transfer donor element of claim 17, wherein curing comprises bringing the mixture to a temperature at which the monomer polymerizes.

20. The thermal transfer donor element of claim 16, further comprising disposing an adhesion layer over the substrate, wherein disposing the mixture comprises disposing the mixture over the adhesion layer.

21. The thermal transfer donor element of claim 16, further comprising disposing a transfer layer over the modified pigment-containing layer.

22. The thermal transfer donor element of claim 21, further comprising disposing an interlayer between the modified pigment-containing layer and the transfer layer.

23. The thermal transfer donor element of claim 16, wherein the mixture further comprises an initiator, an adhesion promoter, or both.

24. The thermal transfer donor element of claim 16, wherein the mixture has a viscosity less than 50 cP.

25. The thermal transfer donor element of claim 16, wherein disposing comprises using one or more of microgravure coating, spin coating, gravure printing, web coating, dip coating, slit coating, and slot coating.

26. A method of performing laser induced thermal transfer, comprising:
providing a thermal transfer donor element comprising a substrate and an LTHC layer supported by the substrate, the thermal transfer donor element having a transfer layer disposed thereon and the LTHC layer having a thickness of at most 4 micrometers and a surface roughness of at most 7%, the LTHC layer comprising a combination product of a dispersant with a modified pigment comprising a pigment having attached at least one organic group comprising an ionic or an ionizable group and a matrix in which the combination product is disposed;
placing the thermal transfer donor element against a receiving substrate; and
irradiating at least a portion of the thermal transfer donor element with sufficient energy in a predetermined pattern to transfer at least a portion of the transfer layer to the receiving substrate according to the predetermined pattern.

27. The method of claim 26, wherein the transfer layer comprises a polymer matrix.

28. The method of claim 26, wherein the transfer layer comprises a biologically active material, a material for a color filter, a material for a black matrix, a material for an organic light emitting diode, a material for an alignment layer for a liquid crystal display, or a material for a transparent electrode.

29. A LTHC layer comprising a light absorbing material and a matrix in which the light absorbing material is dispersed, the LTHC layer having a surface roughness of at most 7% and a thickness of at most 4 micrometers.

30. The LTHC layer of claim 29, wherein the light absorbing material is a combination product of a dispersant and a modified pigment, the modified pigment comprising a pigment having attached at least one organic group comprising an ionic or an ionizable group.

31. The LTHC layer of claim 29, wherein the light absorbing material is a combination product of a dispersant and a modified pigment, the modified pigment comprising an oxidized carbon black.

32. The LTHC layer of claim 29, wherein the light absorbing material is a modified pigment comprising a pigment having attached at least one polymer.

33. A LTHC layer produced by a process comprising:
providing a mixture comprising a solvent, a combination product of a dispersant with a modified pigment comprising a pigment having attached at least one organic group comprising an ionic or an ionizable group, and a matrix precursor comprising one or more of at least one monomer, at least one oligomer, at least one polymer, and at least one resin;
providing a substrate;
disposing the mixture over the substrate; and
removing the solvent from the disposed mixture,
wherein the disposed mixture exhibits self leveling behavior during the removal of solvent and provides the LTHC layer with a surface roughness of at most 7% and a thickness of at most 4 micrometers.

34. The LTHC layer of claim 33, wherein the process further comprises curing the matrix precursor to form a matrix in which the combination product is dispersed.

35. An LTHC layer, comprising:
a combination product of a dispersant and a modified pigment comprising an oxidized carbon black; and
a matrix in which the combination product is disposed, wherein the LTHC layer has a thickness of at most 4 micrometers and a surface roughness of at most 7%.

36. The LTHC layer of claim 35, wherein the matrix comprises a polymer or a resin, or both.

37. The LTHC layer of claim 35, wherein the LTHC layer comprises from 10% to 55% of the modified pigment by weight.

38. The LTHC layer of claim 35, wherein the LTHC layer has an optical density from 0.2 to 3 at a predetermined wavelength.

39. The LTHC layer of claim 38, wherein the predetermined wavelength is in the infrared portion of the electromagnetic spectrum.

40. A thermal transfer donor element, comprising:
- an LTHC layer having a thickness of at most 4 micrometers and a surface roughness of at most 7%, the LTHC layer comprising:
- a combination product of a disperant with a modified pigment comprising an oxidized carbon black; and
- a matrix in which the combination product is disposed.

41. The thermal transfer donor element of claim 40, further comprising a substrate supporting the LTHC layer.

42. The thermal transfer donor element of claim 41, further comprising an adhesion layer disposed between the substrate and the LTHC layer.

43. The thermal transfer donor element of claim 40, further comprising a transfer layer.

44. The thermal transfer donor element of claim 43, further comprising an interlayer disposed between the transfer layer and the LTHC layer.

45. The thermal transfer donor element of claim 43, wherein the transfer layer comprises a polymer matrix.

46. The thermal transfer donor element of claim 43, wherein the transfer layer comprises a biologically active material, a material for a color filter, a material for a black matrix, a material for an organic light emitting diode, a material for an alignment layer for a liquid crystal display, or a material for a transparent electrode.

47. A thermal transfer donor element produced by a method comprising:
- providing a substrate;
- combining a modified pigment concentrate, a solvent and a matrix precursor comprising one or more of at least one monomer, at least one oligomer, at least one polymer, and at least one resin to form a mixture, wherein the modified pigment concentrate comprises a combination product of a dispersant with a modified pigment comprising an oxidized carbon black;
- disposing the mixture over the substrate; and
- removing the solvent from the disposed mixture to form a modified pigment-containing layer having a thickness of at most 4 micrometers and a surface roughness of at most 7%.

48. The thermal transfer donor element of claim 47, wherein the method further comprises curing the matrix precursor to form a matrix in which the modified pigment is dispersed.

49. The thermal transfer donor element of claim 48, wherein curing comprises irradiating the mixture at a predetermined wavelength.

50. The thermal transfer donor element of claim 48, wherein curing comprises bringing the mixture to a temperature at which the monomer polymerizes.

51. The thermal transfer donor element of claim 47, further comprising disposing an adhesion layer over the substrate, wherein disposing the mixture comprises disposing the mixture over the adhesion layer.

52. The thermal transfer donor element of claim 47, further comprising disposing a transfer layer over the modified pigment-containing layer.

53. The thermal transfer donor element of claim 52, further comprising disposing an interlayer between the modified pigment-containing layer and the transfer layer.

54. The thermal transfer donor element of claim 47, wherein the mixture further comprises an initiator, an adhesion promoter, or both.

55. The thermal transfer donor element of claim 47, wherein the mixture has a viscosity less than 50 cP.

56. The thermal transfer donor element of claim 47, wherein disposing comprises using one or more of microgravure coating, spin coating, gravure printing, web coating, dip coating, slit coating, and slot coating.

57. A method of performing laser induced thermal transfer, comprising:
- providing a thermal transfer donor element comprising a substrate and an LTHC layer supported by the substrate, the thermal transfer donor element having a transfer layer disposed thereon and the LTHC layer comprising a combination product of a dispersant with a modified pigment comprising an oxidized carbon black and a matrix in which the combination product is disposed, the LTHC layer having a thickness of at most 4 micrometers and a surface roughness of at most 7%;
- placing the thermal transfer donor element against a receiving substrate; and
- irradiating at least a portion of the thermal transfer donor element with sufficient energy in a predetermined pattern to transfer at least a portion of the transfer layer to the receiving substrate according to the predetermined pattern.

58. The method of claim 57, wherein the transfer layer comprises a polymer.

59. The method of claim 57, wherein the transfer layer comprises a biologically active material, a material for a color filter, a material for a black matrix, a material for an organic light emitting diode, a material for an alignment layer for a liquid crystal display, or a material for a transparent electrode.

60. A LTHC layer produced by a process comprising:
- providing a mixture comprising a solvent, the combination product of a dispersant with a modified pigment comprising an oxidized pigment, and a matrix precursor comprising one or more of at least one monomer, at least one oligomer, at least one polymer, and at least one resin;
- providing a substrate;
- disposing the mixture over the substrate; and
- removing the solvent from the disposed mixture, wherein the disposed mixture exhibits self leveling behavior during the removal of solvent and provides the LTHC layer with a thickness of at most 4 micrometers and a surface roughness of at most 7%.

61. The LTHC layer of claim 60, wherein the process further comprises curing the matrix precursor to form a matrix in which the combination product is dispersed.

62. An LTHC layer, comprising:
- a modified pigment comprising a pigment having attached at least one polymer; and
- a matrix in which the modified pigment is disposed, wherein the LTHC layer has a thickness of at most 4 micrometers and a surface roughness of at most 7%.

63. The LTHC layer of claim 62, wherein the matrix comprises a polymer or a resin, or both.

64. The LTHC layer of claim 62, further comprising a dispersant.

65. The LTHC layer of claim 62, wherein the LTHC layer comprises from 10% to 55% of the modified pigment by weight.

66. The LTHC layer of claim 62, wherein the pigment is a carbonaceous pigment or a colored pigment.

67. The LTHC layer of claim 62, wherein the pigment is a carbon black.

68. The LTHC layer of claim 62, wherein the LTHC layer has an optical density from 0.2 to 3 at a predetermined wavelength.

69. The LTHC layer of claim 68, wherein the predetermined wavelength is in the infrared portion of the electromagnetic spectrum.

70. A thermal transfer donor element, comprising:
an LTHC layer having a thickness of at most 4 micrometers and a surface roughness of at most 7%, the LTHC layer comprising a modified pigment comprising a pigment having attached at least one polymer and a matrix in which the modified pigment is disposed.

71. The thermal transfer donor element of claim 70, further comprising a substrate supporting the LTHC layer.

72. The thermal transfer donor element of claim 71, further comprising an adhesion layer disposed between the substrate and the LTHC layer.

73. The thermal transfer donor element of claim 70, further comprising a transfer layer.

74. The thermal transfer donor element of claim 73, further comprising an interlayer disposed between the transfer layer and the LTHC layer.

75. The thermal transfer donor element of claim 73, wherein the transfer layer comprises a polymer matrix.

76. The thermal transfer donor element of claim 73, wherein the transfer layer comprises a biologically active material, a material for a color filter, a material for a black matrix, a material for an organic light emitting diode, a material for an alignment layer for a liquid crystal display, or a material for a transparent electrode.

77. A thermal transfer donor element produced by a method comprising:
providing a substrate;
combining a modified pigment concentrate, a solvent and a matrix precursor comprising one or more of at least one monomer, at least one oligomer, at least one polymer, and at least one resin to form a mixture, wherein the modified pigment concentrate comprises a modified pigment comprising a pigment having attached at least one polymer;
disposing the mixture over the substrate; and
removing the solvent from the disposed mixture to form a modified pigment-containing layer having a thickness of at most 4 micrometers and a surface roughness of at most 7%.

78. The thermal transfer donor element of claim 77, wherein the mixture further comprises a dispersant.

79. The thermal transfer donor element of claim 77, wherein the method further comprises curing the matrix precursor to form a matrix in which the modified pigment is dispersed.

80. The thermal transfer donor element of claim 78, wherein curing comprises irradiating the mixture at a predetermined wavelength.

81. The thermal transfer donor element of claim 78, wherein curing comprises bringing the mixture to a temperature at which the monomer polymerizes.

82. The thermal transfer donor element of claim 77, further comprising disposing an adhesion layer over the substrate, wherein disposing the mixture comprises disposing the mixture over the adhesion layer.

83. The thermal transfer donor element of claim 77, further comprising disposing a transfer layer over the modified pigment-containing layer.

84. The thermal transfer donor element of claim 83, further comprising disposing an interlayer between the modified pigment-containing layer and the transfer layer.

85. The thermal transfer donor element of claim 77, wherein the mixture further comprises an initiator, an adhesion promoter, or both.

86. The thermal transfer donor element of claim 77, wherein the mixture has a viscosity less than 50 cP.

87. The thermal transfer donor element of claim 77, wherein disposing comprises using one or more of microgravure coating, spin coating, gravure printing, web coating, dip coating, slit coating, and slot coating.

88. A method of performing laser induced thermal transfer, comprising:
providing a thermal transfer donor element comprising a substrate and an LTHC layer supported by the substrate, the thermal transfer donor element having a transfer layer disposed thereon and the LTHC layer comprising a modified pigment comprising a pigment having attached at least one polymer and a matrix in which the modified product is disposed, the LTHC layer having a thickness of at most 4 micrometers and a surface roughness of at most 7%;
placing the thermal transfer donor element against a receiving substrate; and
irradiating at least a portion of the thermal transfer donor element with sufficient energy in a predetermined pattern to transfer at least a portion of the transfer layer to the receiving substrate according to the predetermined pattern.

89. The method of claim 88, wherein the transfer layer comprises a polymer.

90. The method of claim 88, wherein the transfer layer comprises a biologically active material, a material for a color filter, a material for a black matrix, a material for an organic light emitting diode, a material for an alignment layer for a liquid crystal display, or a material for a transparent electrode.

91. A LTHC layer produced by a process comprising:
providing a mixture comprising a modified pigment comprising a pigment having attached at least one polymer, a solvent, and a matrix precursor comprising one or more of at least one monomer, at least one oligomer, at least one polymer, and at least one resin;
providing a substrate;
disposing the mixture over the substrate; and
removing the solvent from the disposed mixture to produce the LTHC layer having a thickness of at most 4 micrometers and a surface roughness of at most 7%,
wherein the disposed mixture exhibits self leveling behavior during the removal of solvent.

92. The LTHC layer of claim 91, wherein the mixture further comprises a dispersant.

93. The LTHC layer of claim 91, wherein the process further comprises curing the matrix precursor to form a matrix in which the modified pigment is dispersed.

* * * * *